(12) United States Patent
O'Connor

(10) Patent No.: US 8,519,012 B2
(45) Date of Patent: Aug. 27, 2013

(54) ARTIFICIAL PHOTOSYNTHESIS

(75) Inventor: Paul O'Connor, Hoevelaken (NL)

(73) Assignee: Antecy B.V., Hoevelaken (NL)

( * ) Notice: Subject to any disclaimer, the term of this patent is extended or adjusted under 35 U.S.C. 154(b) by 0 days.

(21) Appl. No.: 13/400,140

(22) Filed: Feb. 20, 2012

(65) Prior Publication Data

US 2012/0222951 A1    Sep. 6, 2012

Related U.S. Application Data

(63) Continuation of application No. PCT/JP2010/061959, filed on Aug. 17, 2010.

(60) Provisional application No. 61/235,417, filed on Aug. 20, 2009.

(51) Int. Cl.
*C07C 27/00*     (2006.01)
*C01B 31/18*     (2006.01)
*C01B 3/26*      (2006.01)

(52) U.S. Cl.
USPC .......... 518/700; 518/715; 423/418.2; 423/651

(58) Field of Classification Search
USPC .................... 518/700, 715; 423/418.2, 651
See application file for complete search history.

(56) References Cited

U.S. PATENT DOCUMENTS

| | | |
|---|---|---|
| 2006/0211777 A1 | 9/2006 | Severinsky |
| 2008/0283411 A1 | 11/2008 | Eastman et al. |
| 2010/0280135 A1* | 11/2010 | Doty .......................... 518/703 |

FOREIGN PATENT DOCUMENTS

WO    WO 2008115933 A1    9/2008

* cited by examiner

*Primary Examiner* — Jafar Parsa
(74) *Attorney, Agent, or Firm* — Hoyng Monegier LLP; Coraline J. Haitjema; David P. Owen

(57) ABSTRACT

Disclosed is a process for storing solar energy in organic compounds. The process comprises providing a water source and a carbon source. Water present in the water source is activated using solar energy. Activated water is reacted with the carbon source to form an organic compound comprising hydrogen and carbon. The organic compound has higher energy content than the carbon source.

In a specific embodiment the organic compound is used as a fuel in an electricity-generating device, such as a fuel cell. In this embodiment the preferred organic compound is methanol.

21 Claims, 1 Drawing Sheet

ARTIFICIAL PHOTOSYNTHESIS

CROSS REFERENCE TO RELATED APPLICATIONS

This application is a continuation of PCT application number PCT/EP2010/061959 filed on 17 Aug. 2010, which claims priority from U.S. provisional application No. 61/235,417, filed on 20 Aug. 2009. Both applications are hereby incorporated by reference in their entireties.

BACKGROUND OF THE INVENTION

1. Field of the Invention

The invention relates generally to a process for storing solar energy in organic compounds containing carbon and hydrogen, and more particularly to such a process wherein a form of solar energy is used to activate water.

2. Description of the Related Art

Photosynthesis is the process by which plants and certain micro-organisms use solar energy for the conversion of carbon dioxide and water to organic molecules that serve as stores for energy. Examples of such organic compounds include sugars, starch, cellulose, triglycerides, resins, and the like.

Mankind is almost 100% dependent on photosynthesis for its energy needs. The energy required by the human body in the form of food is either a direct product of photosynthesis (all foods of plant origin), or is an indirect photosynthesis product (meat, milk, and other animal food sources). Energy used for heating and for propelling machinery is also almost always derived from photosynthesis, be it in the form of biomass or fossil fuels. The most notable exceptions are solar energy, wind energy and nuclear energy, which do not rely on photosynthesis.

Mankind's dependence on natural photosynthesis for its supplying its energy needs has serious drawbacks. The use of fossil fuels releases carbon dioxide into the atmosphere, which is believed to contribute to climate changes. The use of biomass can be carbon-neutral, but plants are relatively inefficient in converting solar energy to organic molecules. This is due in part to the fact that chlorophyll, the molecule that is responsible for adsorbing solar energy in almost all plants, can absorb only a fraction of the sun's light in the visible part of the spectrum and nothing on other parts of the spectrum, such as infrared or ultraviolet radiation. It is estimated that plants use only about 3% of the solar energy they receive.

Another drawback of natural photosynthesis is that plants require specific conditions in terms of temperature and atmosphere for optimum growth. Thus, photosynthesis is slow at temperatures below about 10° C., and virtually non-existent at temperatures below 0° C. Similarly, at temperatures above about 30° C. plants are challenged to absorb enough water from the soil to allow them to keep up with the evaporation through their leaves. Many plants slow down their photosynthesis during hot weather in order to protect themselves from drying out.

Plants also require an adequate supply of water of a reasonably high quality. With the exception of certain aquatic plants, land based plants generally do not tolerate salt any better than they tolerate droughts. An over-supply of water is also problematic; crops may be lost to flooding just as easily as crops are lost to droughts.

Finally, plants need a balanced supply of minerals and spore elements for their wellbeing. These nutrients need to be supplied by the soil in which the plants grow, and often need to be supplemented by fertilizers.

In summary, the use of plants for mankind's energy needs faces many obstacles and limitations.

Thus, there is a need for a process for storing solar energy in organic molecules. There is a particular need for a process that is more robust than the chlorophyll-based process in terms of temperature requirements. There is a further need for such a process that allows the use of contaminated water.

BRIEF SUMMARY OF THE INVENTION

The present invention addresses these problems by providing a process for storing solar energy in organic compounds comprising carbon and hydrogen, said process comprising the steps of:
(i) providing a water source and a carbon source;
(ii) activating water from the water source using a form of solar energy, in the presence of the carbon source;
(iii) converting the carbon source to organic compounds comprising carbon and hydrogen, said organic compounds having a higher energy content than the carbon source.

DETAILED DESCRIPTION OF THE INVENTION

Several processes are known in which a carbon source is reacted with hydrogen to form a carbon-containing compound having greater energy content than the carbon source itself.

An example of such a process is the Sabatier reaction:

$$CO_2 + 4\,H_2 \rightarrow CH_4 + 2\,H_2O \quad (1)$$

The Sabatier reaction is being studied for its potential to supply energy to manned space missions to the Mars. Hydrogen would be supplied from earth, to be reacted with Martian carbon dioxide in a miniature chemical plant.

The reverse water shift reaction produces carbon monoxide from carbon dioxide and hydrogen:

$$CO_2 + H_2 \leftrightarrow CO + H_2O \quad (2)$$

As indicated by the double arrow, this reaction is reversible, and proceeds to an equilibrium.

The Bosch reaction:

$$CO_2 + 2\,H_2 \rightarrow C + 2\,H_2O \quad (3)$$

can be seen as a two-step reaction, the first step being the reverse water shift reaction, followed by a reaction of carbon monoxide and hydrogen.

As is clear from the reaction equations, these reactions require a supply of hydrogen.

These and other reactions can be carried out using water and solar energy in lieu of hydrogen. Thus, the present invention relates to a process for storing solar energy in organic compounds comprising carbon and hydrogen, said process comprising the steps of:
(i) providing a water source and a carbon source;
(ii) activating water from the water source using a form of solar energy, in the presence of the carbon source;
(iii) converting the carbon source to organic compounds comprising carbon and hydrogen, said organic compounds having a higher energy content than the carbon source.

An important aspect of the process of the present invention is that the input of solar energy, which results in water in an activated form, takes place in the presence of the carbon source. This feature permits the carbon source to react with water in the activated form.

The invention is not limited by specific forms of activated water. In one embodiment the water molecule has one or both of the O—H bonds in an excited state, making it possible for a hydrogen radical to be split off and react with the carbon source. The excited state can be achieved by irradiating water with solar photons, in particular in the UV range of the spectrum. The formation of activated water can be amplified by the use of a suitable semiconductor with a band gap corresponding to the energy of photons in the visible or near ultra-violet part of the spectrum. Titanium dioxide (band gap 3 eV) is an example of a suitable semiconductor material.

In another embodiment solar energy is used to form hydrogen radicals and/or hydrogen molecules. For example, solar energy can be used to generate electric energy in a photovoltaic process. The electric energy can be used for electrolysis of water molecules, whereby hydrogen in atomic form (hydrogen in statu nascendi) is formed. This form of hydrogen is far more reactive than molecular hydrogen. Atomic hydrogen reacts readily with the carbon source.

In yet another embodiment, a form of solar energy is used to dissociate water into hydrogen molecules. Although less reactive than atomic hydrogen, molecular hydrogen can react with the carbon source, in particular in the presence of a suitable catalyst.

The water source does not need to meet stringent requirements in terms of purity. In particular as compared to natural photosynthesis processes, the requirements imposed on the water quality by the process of the present invention are very low. Thus, the process can be carried out with water comprising at least one contaminant.

Specifically, the water source can comprise waste water. The waste water can be industrial waste water, municipal waste water, farm runoff, and the like.

In a particularly preferred embodiment, the water source comprises sea water. Minerals dissolved in sea water impart the water with a high conductivity, which is advantageous for electrolytic processes. The cations dissolved in sea water do not compete with protons for electron acceptance, so the formation of hydrogen is not impeded by their presence.

A wide variety of materials can be used as the carbon source for the process of the invention. Examples include coal; synthetic polymer waste; CO; $CO_2$; and mixtures thereof. Highly preferred is the use of $CO_2$ as the carbon source.

Solar energy can be used in the form in which it reaches earth, that is, in the form of electromagnetic radiation in the infrared, visible, and ultraviolet parts of the spectrum, i.e., photonic energy. It can be desirable to convert this photonic energy to some other form of energy, for example to permit the energy to be temporarily stored. Temporary storage makes it possible to run the process also when the sun is not shining, for example during night time. Relatively advanced technology exists for converting solar energy to photovoltaic energy, which can be stored in rechargeable batteries, for example $Li^-$ion batteries.

The process of the invention itself can be used for storing solar energy in the form of an organic compound, such as an alcohol (for example ethanol or methanol), a hydrocarbon, or a carbohydrate. Preferably the organic compound is a liquid at room temperature, for cost effective storage and transportation. The organic compound can be used as a fuel in a fuel cell for generating electricity. Thus, solar electricity can be made available on a 24/7 basis (24 hours per day, 7 days per week).

Once converted to photovoltaic energy, solar energy can be readily converted to yet other forms of energy, such as microwave energy. It can be desirable to convert the photovoltaic energy back to photonic energy, in the form of a laser beam, for example. Laser permits energy to be submitted to the process in a highly concentrated form.

In an alternate embodiment solar energy is used to generate steam, for example in a Concentrated Solar Thermal (CST) process. The CST process uses lenses, mirrors and a tracking system to focus a large area of sunlight into a small area. The concentrated heat can be used for generating steam, which can be used to generate electricity in a conventional steam generator.

In a specific embodiment of CST the concentrated heat is used to raise the temperature of water to 800-1200° C. The overheated steam is contacted with oxygen-deficient ferrite materials containing transition metals such as zinc and/or nickel. The ferrite can be deposited on an inert support to increase the specific surface area, for example a ceramic honeycomb support. Under these conditions water dissociates into oxygen and hydrogen. Hydrogen can be used in step (iii) of the present process, either in situ, or in a separate reactor after removing oxygen from the hydrogen stream.

In yet another embodiment solar energy is converted in a Photon Enhanced Thermionic Emission (PETE) process. In a PETE process a metal-coated semiconductor material is irradiated with solar radiation. Different from the photovoltaic (PV) process, which only uses the visible part of the spectrum, the semiconductor of the PETE process is able to convert both the visible light and the IR parts of the solar spectrum to electric energy, making the PETE process much more efficient. The semiconductor material used in the PETE process must be able to withstand high temperatures. Suitable examples include gallium nitride and gallium arsenide.

It can be advantageous to carry out step (iii) in the presence of a catalyst. Preferably, the catalyst is an inorganic catalyst. The selection of an appropriate catalyst depends to a large extent from the type of conversion reaction one wants the carbon source to undergo.

In one embodiment step (iii) comprises a Fischer-Tropsch reaction. The Fischer-Tropsch reaction is essentially a reaction of carbon monoxide and hydrogen, to form hydrocarbons, in particular alkanes.

In this embodiment, the carbon source comprises carbon monoxide, which is reacted with hydrogen in statu nascendi, or with molecular hydrogen, or a mixture of the two. In an alternate embodiment, the carbon source comprises $CO_2$, which is first reacted with hydrogen to form CO in the inverse water shift reaction (see equation (2), above), thereby providing the carbon source for the Fischer-Tropsch reaction.

It is desirable to conduct the Fischer-Tropsch reaction in the presence of a Fischer-Tropsch catalyst. Examples include catalysts comprising Ni, Fe, Co, Ru, Ce, or a combination thereof. It is advantageous to use a catalyst carrier that is capable of absorbing solar photonic energy, such as $TiO_2$. Step (iii) is preferably carried out while solar energy is supplied to the reaction mixture, for example in the form of photonic energy.

Traditional Fischer-Tropsch processes require high temperatures and high hydrogen pressures. The process of the present invention can be carried out under much milder conditions. This is believed to be due to the greater reactivity of the hydrogen, possibly amplified by photonic solar energy being supplied to the reaction mixture.

In an alternate embodiment, step (iii) comprises a Sabatier reaction. The carbon source for the Sabatier reaction is carbon dioxide. Carbon dioxide can be obtained from processes in which fuels, in particular fossil fuels, are combusted. Examples include refineries, power plants, and the like.

The Sabatier reaction is preferably carried out in the presence of a Sabatier catalyst. Particularly preferred are catalysts comprising Ru.

In a specifically preferred embodiment, the Sabatier catalyst comprises a hydrogenating metal, such as Ni or Ru, on a semiconductor support, such as $TiO_2$. The metal portion of the catalyst is only partially reduced. For example, a $Ru/TiO_2$ catalyst is reduced in an $Ar/H_2$ (1:1 ratio) stream, at a temperature in the range of 200° C. to 250° C. Full reduction of $RuO_2$ requires a reduction temperature of 500° C.

The $Ru/TiO_2$ catalyst permits the Sabatier reaction to be carried out under atmospheric pressure, at temperatures in the range of from 25 to 200° C. The catalyst is particularly effective when the reaction mixture is illuminated with solar photonic energy.

In yet another embodiment, the catalyst is an inorganic oxide or hydroxide. Catalysts of this type can be used with a wide variety of carbon sources, including coal and synthetic polymers.

Preferred within this class of catalysts are hydrotalcite; hydrotalcite-like materials; clays; alumina; layered hydroxy salts; mixed metal oxides; and the calcination products of any of these materials. The term "hydrotalcite-like" materials as used herein refers to mixed metal oxides having the general crystal structure of hydrotalcite, and wherein all or part of the $Al^{3+}$ is replaced with another trivalent cation, and/or all or part of the $Mg^{2+}$ is replaced with another divalent cation.

The type of organic compounds produced in step (iii) depends on the nature of the carbon source, and the type of reaction conducted. For example, if the carbon source is carbon dioxide, and the reaction is a Sabatier reaction, the primary (or sole) reaction product is methane. If the carbon source is carbon dioxide or carbon monoxide, and the reaction is a Fischer-Tropsch reaction, the reaction product is a mixture of hydrocarbons, primarily alkanes.

Methane produced in a Sabatier reaction can be readily converted to methanol, using well-known prior art processes. Methanol can be used as a fuel for a fuel cell.

If the carbon source is coal, the reaction product is a mixture of hydrocarbons, both saturated and unsaturated hydrocarbons. The unsaturated hydrocarbons can include aromatic hydrocarbons.

If the carbon source is a synthetic polymer, such as a polyolefin, the reaction product is a mixture of hydrocarbons, in particular alkanes. Oxygen-containing polymers, such as polyesters, generally produce mixtures of hydrocarbons and oxygen-containing compounds, such as alcohols and aldehydes. It is possible to convert polyesters entirely to hydrocarbons.

The organic compounds produced in step (iii) can be used as platform chemicals, to produce specialty chemicals. The organic compounds can also be used as a fuel. Generally, when used as a fuel, the organic compounds are combusted to carbon dioxide and water. Carbon dioxide formed in the combustion reaction can be recycled as a carbon source to step (i) of the process. Water formed in the combustion reaction can also be recycled to step (i), as a water source. However, water formed in the combustion reaction is generally of greater purity than is required for the process of the invention.

It is desirable to use water formed in the combustion reaction for uses where purity is important, such as in agriculture for irrigation and for consumption by animals. The water produced in the combustion reaction can even be of sufficient quality to be used for human consumption, either as-is, or after some further purification.

In a specific embodiment, the organic compound is used as a fuel in an electricity-generating device, such as a fuel cell. In this embodiment the process comprises an additional step:
(iv) converting the organic compounds to electric energy.

Suitable examples of the electricity-generating device include conventional power plants; generators; and fuel cells. Preferred are fuel cells.

BRIEF DESCRIPTION OF THE DRAWINGS

The features and advantages of the invention will be appreciated upon reference to the following drawings, in which.

DESCRIPTION OF A SPECIFIC EMBODIMENT

Figure 1:
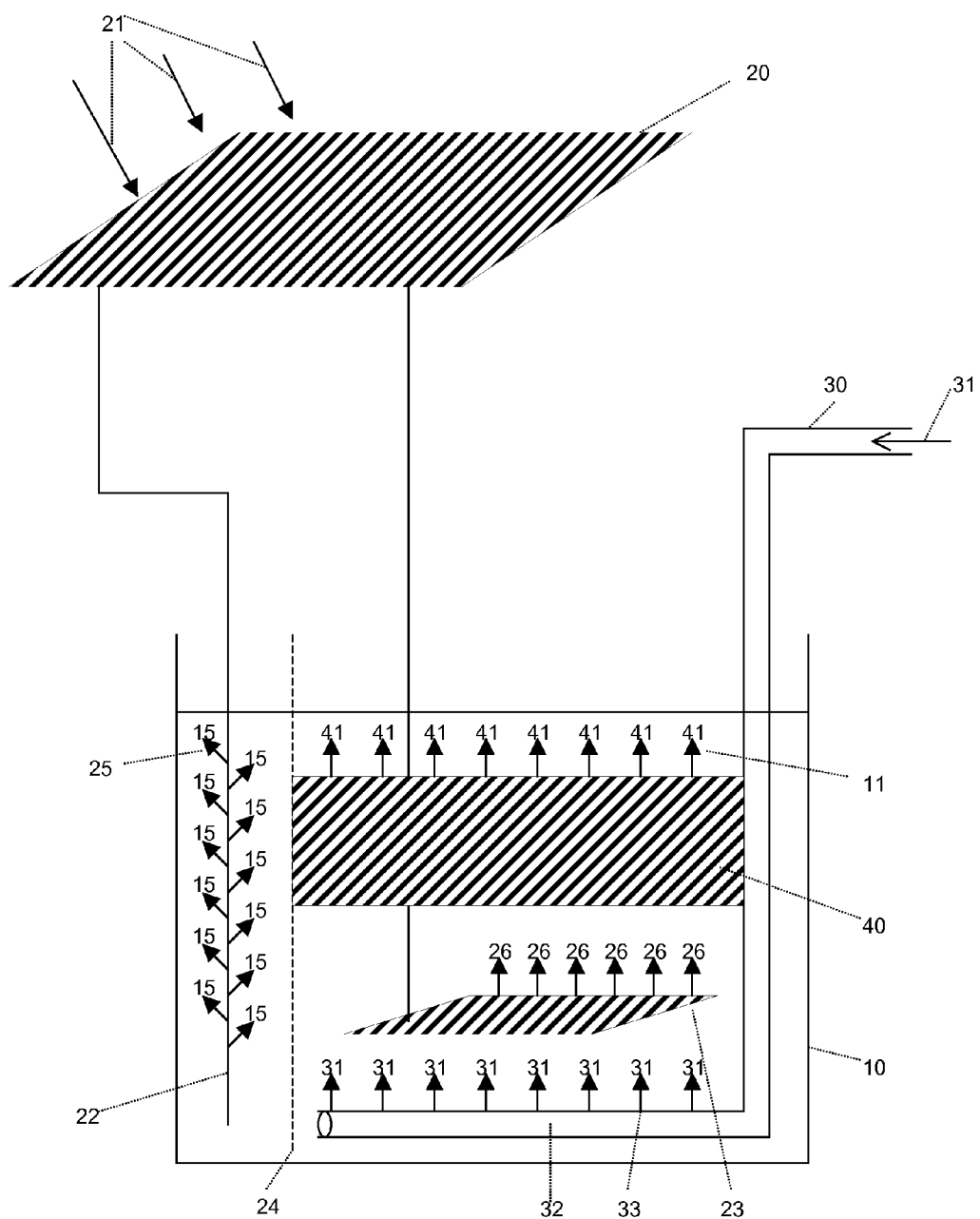
FIG. 1 is a schematic front view of an embodiment of the present invention.

The invention will be further illustrated with reference to a specific embodiment shown schematically in FIG. 1.

Reactor 10 comprises a water source 11. Photovoltaic panel 20 receives solar photonic energy 21, which it converts to photovoltaic energy. The photovoltaic energy feeds anode 22 and cathode 23, both of which are immersed in water source 11. Anode 22 and cathode 23 are optionally separated by membrane 24.

Tube 30 receives carbon source 31 from an external supply (not shown). The carbon source can be CO. Carbon source 31 is pumped to tube end 32, which is immersed in water source 11. Carbon source 31 leaves tube end 32 through holes 33.

Anode gas 25 is formed at anode 22. Anode gas 25 can be oxygen (from the electrolysis of $OH^-$ ions in water source 11, or it can be some other gas, for example $Cl_2$, if water source 11 contains $Cl^-$ ions. Anode gas 25 is collected in a gas container (not shown).

Hydrogen gas 26 is formed at cathode 23. Both carbon source 31 and hydrogen gas 26 rise upward in water source 11, and become mixed with one another. The gas mixture passes through catalyst bed 40, where carbon source 31 is reacted with hydrogen gas 26. Reaction product 41 is a liquid hydrocarbon, which floats to the surface of water source 11.

In an alternate embodiment the reaction product comprises gaseous hydrocarbons, which are collected above the surface of water source 11.

In yet another embodiment, the catalyst is slurried in water source 11, which is continuously agitated.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for storing solar energy in organic compounds comprising carbon and hydrogen, said process comprising the steps of:
   (i) providing a water source and a carbon source;
   (ii) activating water from the water source using a form of solar energy, in the presence of the carbon source;
   (iii) converting the carbon source to organic compounds comprising carbon and hydrogen, said organic compounds having a higher energy content than the carbon source.

2. The process of claim 1 wherein the water source comprises water and at least one contaminant.

3. The process of claim 1 wherein step (ii) comprises forming hydrogen radicals; hydrogen molecules; or a mixture thereof.

4. The process of claim 1 in which the carbon source is selected from the group consisting of coal; synthetic polymer waste; CO; $CO_2$; and mixtures thereof.

5. The process of claim 1 wherein the form of solar energy is selected from the group consisting of photovoltaic energy; microwave energy; photonic energy; and combinations thereof.

6. The process of claim 5 wherein the solar energy is converted in a photon enhanced thermionic emission (PETE) process.

7. The process of claim 5 wherein the solar energy is converted in a Concentrated Solar Thermal (CST) process.

8. The process of claim 7 wherein the CST process is used to dissociate water into hydrogen and oxygen, the hydrogen being used in step (iii) of the process.

9. The process of claim 1 wherein step (iii) is carried out in the presence of a catalyst.

10. The process of claim 9 wherein step (iii) is carried out in the presence of a Fischer-Tropsch catalyst.

11. The process of claim 10 wherein the catalyst comprises Ni, Fe, Co, Ru, Ce, or a combination thereof.

12. The process of claim 1 wherein step (iii) comprises a Sabatier reaction.

13. The process of claim 1 wherein step (iii) is carried out in the presence of a catalyst comprising an inorganic oxide or hydroxide.

14. The process of claim 13 wherein the catalyst is selected from the group consisting of hydrotalcite; hydrotalcite-like materials; clays; alumina; layered hydroxy salts; mixed metal oxides; and calcination products thereof.

15. The process of claim 1 wherein the organic compounds comprising carbon and hydrogen produced in step (iii) comprise hydrocarbons; carbohydrates; or a mixture of hydrocarbons and carbohydrates.

16. The process of claim 1 further producing water suitable for use in agriculture.

17. The process of claim 1 further producing water suitable for human consumption.

18. The process of claim 1 comprising the further step:
(iv) converting the organic compounds to electric energy.

19. The process of claim 18 wherein step (iv) is carried out in an electricity-generating device.

20. The process of claim 18 wherein the organic compounds comprise methanol.

21. The process according to claim 19, wherein step (iv) is carried out in a fuel cell.

* * * * *